United States Patent
Frankel et al.

(10) Patent No.: US 7,743,967 B2
(45) Date of Patent: *Jun. 29, 2010

(54) CHROMIUM-FREE WELDING CONSUMABLE

(75) Inventors: Gerald S. Frankel, Columbus, OH (US); John C. Lippold, Hilliard, OH (US)

(73) Assignee: The Ohio State University, Columbus, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 12/028,891

(22) Filed: Feb. 11, 2008

(65) Prior Publication Data

US 2008/0128393 A1    Jun. 5, 2008

Related U.S. Application Data

(62) Division of application No. 11/090,976, filed on Mar. 25, 2005, now Pat. No. 7,425,229.

(60) Provisional application No. 60/557,031, filed on Mar. 26, 2004.

(51) Int. Cl.
- *B23K 26/20* (2006.01)
- *B23K 35/30* (2006.01)
- *B23K 103/04* (2006.01)

(52) U.S. Cl. ............... 228/262.3; 219/146.23
(58) Field of Classification Search .......... 228/262.3; 219/146.23
See application file for complete search history.

(56) References Cited

U.S. PATENT DOCUMENTS

| | | | |
|---|---|---|---|
| 2,815,282 A | 12/1957 | Rhodes et al. | |
| 3,450,527 A | 6/1969 | Tanzman | |
| 3,584,187 A * | 6/1971 | Majetich et al. | 219/137 R |
| 3,909,253 A | 9/1975 | Asnis et al. | |
| 4,149,063 A | 4/1979 | Bishel | |
| 4,218,245 A | 8/1980 | Batova et al. | |
| 4,497,772 A * | 2/1985 | Mizuhara | 420/457 |
| 4,704,338 A | 11/1987 | Landingham et al. | |

(Continued)

FOREIGN PATENT DOCUMENTS

GB    976660    12/1964

(Continued)

OTHER PUBLICATIONS

JP 2004-017118 Machine translation.*

(Continued)

*Primary Examiner*—George Wyszomierski
*Assistant Examiner*—Tima M McGuthry-Banks
(74) *Attorney, Agent, or Firm*—Dinsmore & Shohl LLP (57) ABSTRACT

A chromium-free welding consumable and a method of welding stainless steel to reduce the presence of chromium emissions. The consumable is made from an alloy that reduces the emission of chromium during a welding process, and include predominantly nickel, with between approximately five and twenty five percent by weight copper, up to approximately five percent by weight of palladium, up to approximately ten percent by weight of molybdenum and up to five percent non-copper alloying ingredients. Welding consumables made from the alloy are particularly well-suited for welding austenitic stainless steels, such as type 304 stainless steel. The method involves using chromium-free weld filler material with a stainless steel base material.

19 Claims, 4 Drawing Sheets

U.S. PATENT DOCUMENTS

| | | | |
|---|---|---|---|
| 4,764,435 A | 8/1988 | Hosizaki et al. | |
| 4,785,137 A | 11/1988 | Samuels | |
| RE33,186 E | 3/1990 | Mori et al. | |
| 5,171,968 A | 12/1992 | Bates et al. | |
| 5,236,661 A | 8/1993 | Hidaka et al. | |
| 6,613,159 B1 | 9/2003 | Koch et al. | |
| 2004/0160155 A1* | 8/2004 | Partlo et al. | 313/231.31 |

FOREIGN PATENT DOCUMENTS

| | | | |
|---|---|---|---|
| GB | 2128528 A * | 5/1984 | |
| JP | 55027481 | 2/1980 | |
| JP | 56095490 | 8/1981 | |
| JP | 56127707 A * | 10/1981 | |
| JP | 2001047235 A | 2/2001 | |
| JP | 2004017118 A * | 1/2004 | |
| RU | 2098247 | 12/1997 | |

OTHER PUBLICATIONS

Schwartz, Melvin M. "Introduction to Brazing and Soldering." download from http://products.asminternational.org/hbk/do/highlight/content/V06/D02/A01/index.html on Apr. 29, 2009. copyright 2002 ASM International.

JP 2004-017118 Machine translation, published Jan. 2004.

\* cited by examiner

CHROMIUM-FREE WELDING CONSUMABLE

CROSS-REFERENCE TO RELATED APPLICATION

This application is a divisional of application Ser. No. 11/090,976, filed Mar. 25, 2005, now U.S. Pat. 7,425,229. This application claims the benefit of the filing date of U.S. Provisional Application No. 60/557,031, filed Mar. 26, 2004.

STATEMENT REGARDING FEDERALLY SPONSORED RESEARCH OR DEVELOPMENT

This invention was supported by the government under Contract No. DACA 72-03-P-0014 awarded by the Department of Defense under the Strategic Environmental Research and Development Program. The government has certain rights in the invention.

BACKGROUND OF THE INVENTION

This invention relates generally to chromium-free welding materials, and in particular to a chromium-free welding consumable and methods employing such consumables for joining or repairing stainless steel base metals, where the weld retains its structural and corrosion properties, even in harsh environments.

Stainless steels or, more precisely, corrosion-resisting steels are a family of iron-base alloys having excellent resistance to corrosion. These steels do not rust and strongly resist attack by a great many liquids, gases, and chemicals. Stainless steels are generally divided into three classes, austenitic, ferritic or martensitic (with a possible austenitic-ferritic duplex class), depending on the predominant microstructural phase. Many of the stainless steels have good low-temperature toughness and ductility, and generally exhibit good strength properties and resistance to scaling at high temperatures. All stainless steels contain iron as the main element and chromium (Cr) in amounts ranging from about 11% to 30%, where the presence of chromium in such concentrations enhances corrosion resistance. Additional elements, such as nickel (Ni), manganese (Mn), silicon (Si), carbon (C) and molybdenum (Mo), may be added to impart other desirable properties. Of the three classes, the austenitic stainless steels have the best combination of corrosion resistance, mechanical properties, and weldability, where their corrosion resistance is due at least in part to the high chromium content and nickel additions. An example of an austenitic stainless steel is the American Iron and Steel Institute (AISI) number 304 stainless steel, also called "type 304 stainless steel", "304 stainless steel" or merely "type 304". Specific variants of type 304 stainless steel, such as 304L (for low carbon) are often used in naval and related applications.

Stainless steel components are often joined by welding. Consumable filler metals matching or exceeding the chromium content of the base metal have proven to be effective in ensuring that the welds exhibit sufficient corrosion resistance. Existing filler material for welding the various stainless steel base metals, based on Unified Numbering System (UNS) designations include austenitic (UNS Nos. W30810, W30910, W31010, W31610, W31710 and W34710), martensitic (UNS Nos. W41010 and W42010 and ferritic (UNS Nos. S40900 and S43080) formulations. For austenitic stainless steels, such as type 304, the chromium content of the welding consumable is generally between 18 and 20 percent by weight.

During many welding processes, evaporation and oxidation of chromium from the molten weld pool results in the emission of hexavalent chromium that is present in the fumes. In fact, the consumable filler material is typically the major source of welding fumes, sometimes accounting for over 80% of the shielded metal arc welding (SMAW) weld metal. Accordingly, the possibility exists for significant generation of hexavalent chromium in the weld fumes. While there are several valence states of chromium (the composition and oxidation state of which depends strongly on the process details such as arc voltage, type of filler material, welding current and the presence of a shielding gas in the welding atmosphere), it is the hexavalent chromium compounds (Cr VI) that are of particular interest, as they are suspected of leading to lung cancer and other health problems. The problem of a Cr VI-rich local atmosphere is exacerbated when the welding is conducted in confined and related spaces lacking adequate ventilation. For example, welding onboard a ship typically involves a manual process using an arc method (such as SMAW or a related electric arc method), which has been shown to generate considerable amounts of fume, up to 0.3 g/min or 8 g/kg of deposit. While these hazardous conditions can be somewhat meliorated by adequate ventilation, such ventilation can be extremely difficult to implement in many situations, and alone may not be sufficient if the permissible exposure limits (PELs) to Cr VI are lowered.

An outgrowth of such significant potential health hazards is that these and other welding operations have been under increased scrutiny recently. For example, the U.S. Department of Labor's Occupational Safety and Health Administration (OSHA) recently decreased the PEL on Cr VI from 52 to 5 mg/m$^3$ as Cr VI. Manganese-bearing fumes are also a concern for manganese toxicity, which affects the central nervous system. As with hexavalent chromium, manganese has been the focus of considerable recent attention, where the OSHA PEL has been set at 5 mg/m$^3$, with the NIOSH REL of 1 mg/m$^3$.

Accordingly, there is a need for developing a consumable for welding austenitic stainless steel that is chromium- and manganese-free to limit the generation of dangerous emission of these metals in the welding fumes.

SUMMARY OF THE INVENTION

This need is met by the present invention, where consumables made from chromium-free alloys are suitable for use as a weld material for austenitic stainless steels. According to an aspect of the invention, a substantially chromium-free welding material is disclosed. The material includes up to approximately five percent by weight of palladium (Pd), up to approximately ten percent by weight of molybdenum, between approximately five and twenty five percent by weight copper (Cu) and a balance of nickel with up to five percent non-copper alloying ingredients. In one specific composition, a nickel-based alloy with between five and ten percent copper and up to approximately one percent palladium can be used. In another specific composition, up to approximately three percent molybdenum can be used.

Optionally, the material is configured as a wire, coated electrode, flux-cored wire or the like. Preferably, at least some of the alloying ingredients are elements, including one or more of carbon, boron, nitrogen, manganese, silicon, tungsten, tantalum, niobium and vanadium. While palladium is beneficial in that it provides resistance to localized corrosion and ennobles the corrosion potential of the weld metal, its relatively high cost would favor low concentrations, such as one percent or lower. Even the addition of only small amounts (for example, 0.12%) improves the localized corrosion properties of nickel-copper alloys, especially those alloys with lower copper content. The addition of copper to nickel also improves the corrosion behavior and ennobles the corrosion potential, and the inventors have determined that while a relatively broad range of copper concentrations is beneficial, concentrations of up to approximately twenty five percent by weight are suitable, with concentrations between approximately five and ten percent demonstrating even more corrosion resistance for harsh environments.

According to another aspect of the present invention, a welding device including up to approximately five percent by weight of palladium, up to approximately ten percent by weight of molybdenum, up to approximately twenty five percent by weight copper and a balance of nickel and up to five percent non-copper alloying elements is disclosed such that the device is substantially chromium-free. In one optional form, the device comprises a welding consumable. In one embodiment, the device is defined by a weld metal with higher corrosion potential than a stainless steel workpiece (for example, a type 304 stainless steel), thereby promoting corrosion resistance in the weld. In one formulation, the device is made up of approximately five percent copper and up to approximately one percent palladium. In another formulation, the device is made up of between approximately five and ten percent copper and up to approximately one percent palladium. In another, it is made up of approximately five percent copper and up to approximately three percent molybdenum.

According to another aspect of the present invention, a nickel alloy having a structural configuration adapted for use as a welding electrode is disclosed. The alloy includes up to ten percent by weight copper, at least one element selected from the group consisting of molybdenum and tungsten in an amount up to ten percent by weight, at least one element selected from the group consisting of silicon and manganese in an amount up to three percent by weight, at least one deoxidizing element and up to five percent by weight palladium. Optionally, the total percentage by weight of copper is between approximately five and ten percent. Similarly, the de-oxidizing element is preferably aluminum or titanium.

According to yet another aspect of the present invention, a method of welding a stainless steel base material is disclosed. The method includes providing a chromium-free welding consumable in one of the compositions previously described, and welding the base material with the welding consumable to produce a welded composition. Optionally, the method produces less than a forty percent dilution of the weld by the base material. In one form, the base material comprises an austenitic stainless steel, for example, type 304 stainless steel. The welding consumable comprises up to one percent palladium.

DETAILED DESCRIPTION OF THE INVENTION

The present inventors have determined that chromium-free welding consumables made from nickel alloys containing copper, palladium and molybdenum are suitable for use as a weld metal for type 304 stainless steel. Elimination of chromium from the filler metal leads to significant reduction of the chromium content in fumes generated when welding a type 304 base metal workpiece. The present inventors have also determined that by controlling dilution of the filler metal by the base metal, these welds also exhibit good weldability by GTAW (formerly known as tungsten inert gas (TIG) welding). The strength of these welds is comparable to welds made with standard 308L filler metal, exhibiting sufficient corrosion resistance in dilute chloride solutions, such as 0.1M NaCl solutions. The present inventors have also discovered that under certain circumstances (for example, more aggressive environments), weld consumables that employ lower concentrations of copper may exhibit even further improvements over consumables with relatively high quantities of copper.

If a stainless steel (such as type 304 or its low carbon variant) base metal is to be welded with a filler metal that is different in composition than the base metal, then the corrosion of the welded structure will be controlled by the galvanic interaction between the two. Stainless steel exhibits corrosion resistance because of the presence of a thin chromium-rich oxy-hydroxide surface film, the so-called passive film, which forms spontaneously upon exposure of a fresh metal surface to air or aqueous solution. However, stainless steel, like other passive metals, is susceptible to localized corrosion in chloride-containing environments. In fact, the corrosion of passive metals such as stainless steels is often localized in nature, where localized corrosion in the form of pits and crevices will occur above a characteristic breakdown potential in a given environment. Thus, one design criterion for preventing localized corrosion is to require that the corrosion potential stay lower than the breakdown potential. Nevertheless, localized corrosion has been shown to propagate at potentials lower than the breakdown potential. Therefore, a more conservative design criterion is that the corrosion potential must stay below a characteristic repassivation potential that is lower than the breakdown potential.

Figure 1:
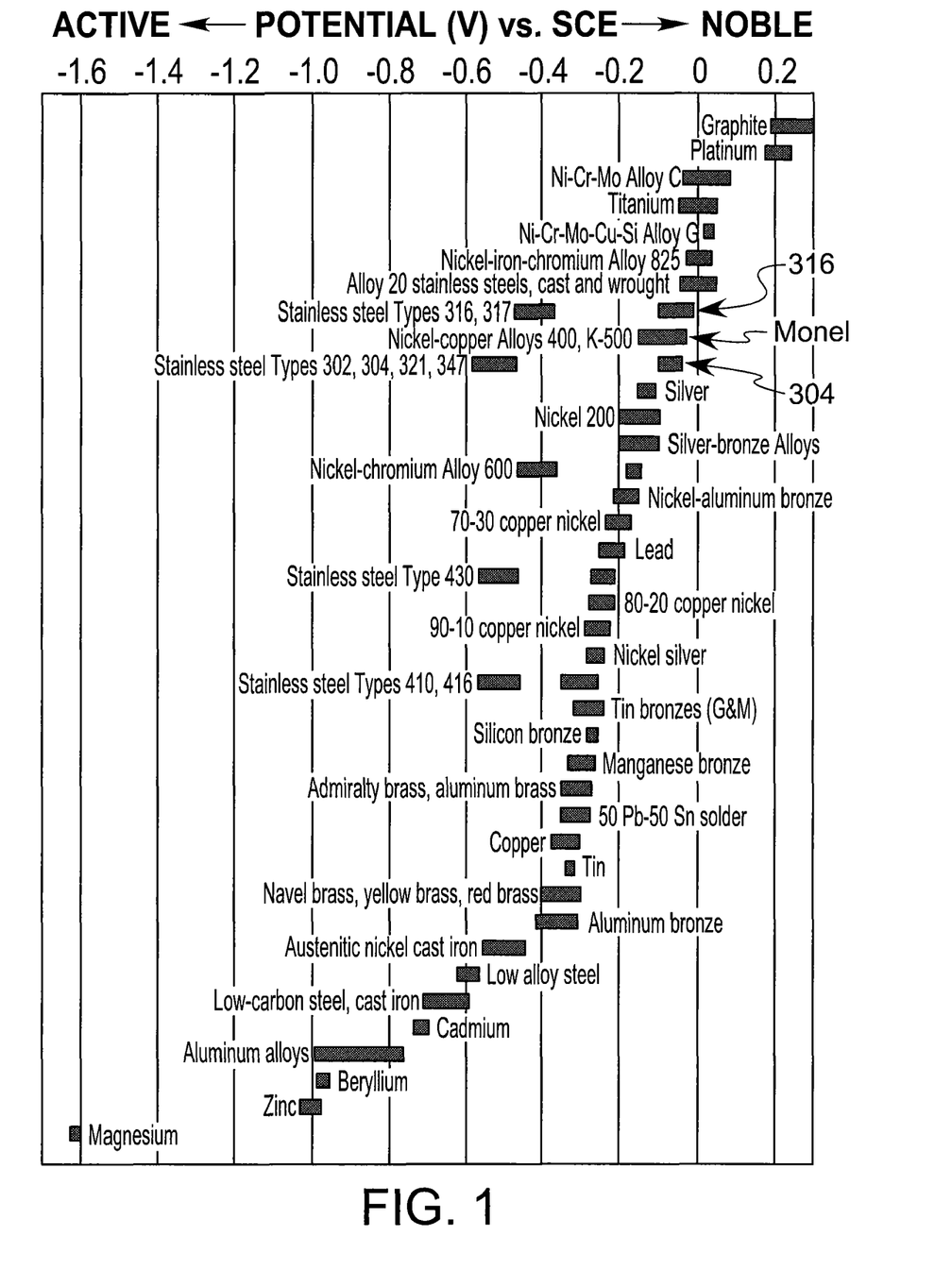
FIG. 1 is the known galvanic series for seawater.

When two different metals are electrically coupled (as are a weld and a base metal workpiece) and exposed to the same environment, galvanic interactions will occur. Referring first to FIG. 1, the more active, or less-noble, metal (i.e., the one with the lower corrosion potential in that environment) will undergo accelerated attack and the more noble metal will be protected. This galvanic protection is a form of cathodic protection for the more noble metal, and is the mechanism for the well-known corrosion protection of a steel substrate by a zinc coating in a galvanized structure. The materials farther to the right in the figure are more noble, those farther to the left, less so. The ranges of potentials for types 304 and 316 are indicated, while that of the nickel-copper alloys 400 and K-500 are located between the two.

One key aspect in galvanic coupling is the area ratio of the two metals. It can be shown that $i_a$, the anodic current density or corrosion rate of the anode or less noble metal, depends upon the ratio of the areas of the cathode and anode, $A_c$ and $A_a$, and the current density at the cathode, $i_c$ according to:

$$i_a = \frac{A_c}{A_a} i_c \quad (1)$$

Thus, if one area is significantly larger than the other, then the galvanic potential of the couple is pinned at the uncoupled corrosion potential of the larger metal. For a welded stainless steel structure, the area of the weld metal is much less than the area of the substrate being welded, which means that the potential of the weld will be set by the corrosion potential of the stainless steel in the particular environment. If the weld metal is less noble than the stainless steel, the galvanic coupling will result in an increase in the potential of the weld. This can result in aggressive attack of the weld if the stainless steel corrosion potential is above the breakdown potential of the weld, or if the less noble weld metal does not passivate and dissolves actively. However, if the weld metal is noble relative to the stainless steel, then the galvanic coupling will result in cathodic protection of the weld metal by the stainless steel.

The inventors have found that it is possible to use the fundamental principles outlined above to develop design criteria for a new weld metal for stainless steel. The design criteria are as follows: (1) the breakdown and repassivation potentials of the weld metal should be higher than the corrosion potential of the stainless steel substrate to prevent localized attack of the weld metal; and (2) if possible, the corrosion potential of the weld metal should be slightly higher than that of the stainless steel substrate so that the weld metal is cathodically protected.

Weldability Tests

To determine the applicability of various welding consumables, the inventors conducted numerous weldability tests of stainless steel with Alloy 400, commonly known under the trade name Monel®, which, as shown in the figure, is galvanically compatible with 304 stainless steel. Monel® contains 31% copper (typical value), and maximum concentrations of 2.5% iron (Fe), 2% manganese, 0.5% silicon, 0.3% carbon and 0.024% sulfur (S). Monel® has good corrosion, erosion and cavitation resistance in seawater and is widely used in seawater under conditions of high flow velocity such as propellers, shafts, condenser tubes and heat exchangers. While Monel® has been used to weld Monel® substrates, the present inventors are unaware of any attempt to use it to weld stainless steel substrates for the purpose of reducing chromium emissions.

Figure 7:
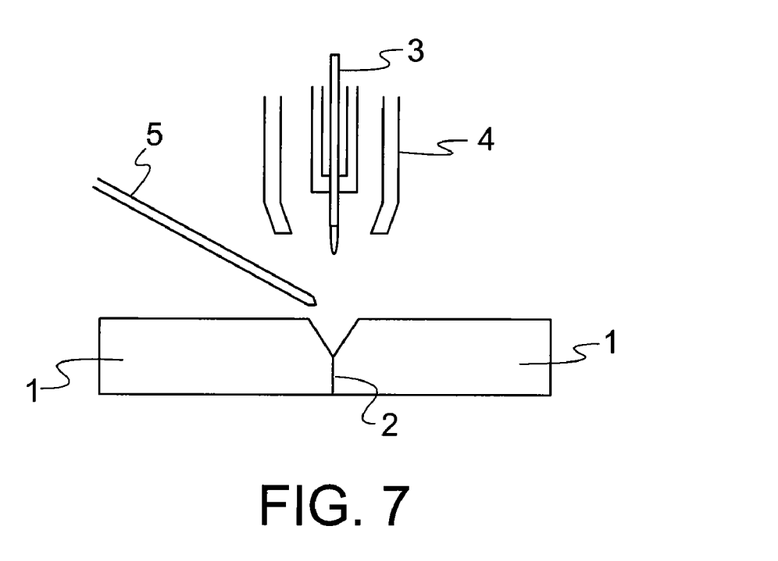
FIG. 7 illustrates a gas tungsten arc welding (GTAW) process.

Referring next to FIG. 7, a welding configuration for GTAW is shown, where electrode 3 was placed above welding workpiece (also referred to as base material) 1 having weld joint 2 at the edge to be welded. Electrode 3 is brought close to the joint area, where a direct electric current of 150 A at a voltage of 12V is applied to generate an electric arc between base material 1 and electrode 3. Using this setup, weld rods 5 were fused and deposited along the notch adjacent the weld joint 2 while using an inert gas (for example, argon) from gas nozzle 4 surrounding electrode 3 to cover the area to be welded and thereby minimize or eliminate atmospheric influences.

Welds were made using ¼" 304L base metal and 0.045" diameter commercially-available ERNiCu-7 (Monel® 60) or standard 308L stainless steel filler wire using the GTAW process. The calculated weld metal composition for Monel® 60 welds at two different dilutions and threshold composition values for maintaining good weldability are listed, along with the compositions of these materials, in Table 1.

TABLE 1

Composition range of Monel ® filler metal and 304L base metal.

| Element (wt %) | Monel ® 60 Wire | 304L SS | 15% Dilution calculated | 40% Dilution calculated | Weldability Threshold Value |
|---|---|---|---|---|---|
| Ni | 63.99 | 8.08 | 55.60 | 41.63 | unlimited |
| Cu | 28.81 | — | 24.49 | 17.29 | unlimited |
| Fe | 0.76 | 72.10 | 11.46 | 29.30 | 15 |
| Cr | — | 18.09 | 2.71 | 7.24 | 6 |
| Mn | 3.49 | 1.24 | 3.15 | 2.59 | unlimited |
| Ti | 1.99 | — | 1.69 | 1.19 | not reported |
| Si | 0.90 | 0.37 | 0.82 | 0.69 | 1.5 |
| N | — | 0.06 | 0.01 | 0.02 | not reported |
| C | 0.05 | 0.03 | 0.05 | 0.04 | 0.4 |
| Others | 0.01 | 0.03 | 0.01 | 0.02 | |

Also shown in Table 1 are the calculated values of weld metal composition for 15 and 40% dilution for the 304L base metal and Monel® 60 filler metal. This represents a typical range for most arc welding processes. In the present context, "dilution" is defined as dilution of the filler metal by the base metal. The threshold composition values given in the last column of the table suggest that the weld dilution should be kept below 40% to avoid solidification cracking. GTAW was the welding process used in this test because it is easier to automate and control than the most common process for manual welding of stainless steel, SMAW. Details of the GTAW process are given in Table 2.

TABLE 2

Details of GTAW procedure

| | |
|---|---|
| Current | 150 Amp |
| Voltage | 12 V |
| Travel speed | 5 in/min |
| Heat input | 21.6 kJ/in (0.85 kJ/mm) |
| Wire feed speed | 45 in/min |
| Shielding gas | Argon + 5% $H_2$ |
| Shielding gas flow rate | 30 cubic ft/min |
| Joint design | V- groove 90°, gap: 0.118 in |

Figure 2:
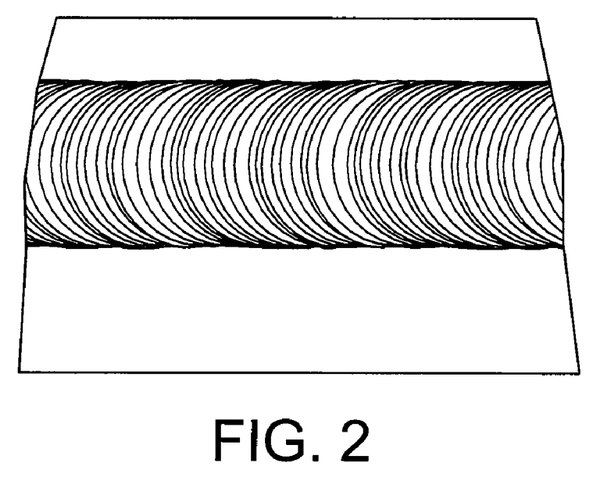
FIG. 2 shows a Monel®/304L weld with the ends etched.

Referring next to FIG. 2, an example of a weld achieved with a Monel® 60-based consumable is shown. As described below, the 304/Monel® 60 weld structure exhibited good corrosion resistance to dilute chloride solutions, but was susceptible to attack in the copper-rich interdendritic region of the weld structure. Solidification cracks were observed in high-dilution welds, but not if the dilution of the Monel® 60 filler metal by the 304L base metal was kept below about 30%. Thus, the present inventors are of the belief that avoidance of solidification cracks with a Monel® 60 filler metal on a 304 stainless steel substrate is possible if the dilution level is kept to no more than 30 to 40%.

While the use of pure argon gas for shielding resulted in surface contamination (slagging) and welds of unsatisfactory quality, the inventors discovered that use of an argon environment with 5% hydrogen shielding gas, in conjunction with control of weld heat input, significantly diminished this slagging effect. The inventors also noticed that the effect of slagging in the pure argon environment was worse at high heat inputs, possibly due to the presence of titanium in the Monel® 60 weld wire. The weld was found to be fully austenitic with perhaps some second phase formation in the interdendritic regions. Compositional profiles determined by scanning electron microscopy and energy dispersive spectrometer (SEM/EDS) from the base metal into the weld nugget of a particular Monel®/304L weld indicated that there was about 10% iron and a few percent of chromium in the weld nugget as a result of dilution. Also evident was a transition zone in which the composition changed from the base metal to the weld metal.

Mechanical Properties and Corrosion Testing

A Monel® 60/304L weld was tested by bending over a ¾" mandrel, resulting in 15% tensile strain in the outer fibers. The sample passed this test with no evidence of cracking. Microhardness profiling was performed along the weld cross-section. The hardness of the Monel® 60 weld metal is slightly below that of welds made with 308L filler metal. Transverse weld tensile tests also exhibited good weld ductility with tensile strengths comparable to those achieved in welds made under the same conditions with 308L filler material applied to a type 304L workpiece. In summary, the mechanical properties of the Monel® 60/304L welds were acceptable and meet the mechanical property requirements for Type 308L stainless steel welds.

The long term exposure tests on the Monel® 60/304L welds indicated that they have good corrosion resistance to mildly aggressive chloride solutions open to air. No attack was observed after exposure to 0.1M NaCl. After fifty days in artificial seawater the bottom side of the weld was attacked at the interface of the weld metal and base metal, but the top side was unattacked. Purposeful attack of the weld by aggressive etchants or polarization in chloride solution to high potentials revealed that the most susceptible region of the weld is the copper-rich interdendritic microstructure. In other words, the corrosion susceptibility is greatest at copper-rich segregated zones in the dendritic weld structure. This led the present inventors to undertake additional studies to determine if decreasing the copper content of the consumables would lead to improved corrosion behavior in the weld.

Accordingly, subsequent corrosion studies focused on alloys with copper content lower than the nominal 30% associated with Monel®. Corrosion testing was performed on welded samples and on buttons prepared by electric-arc melting of pure elemental mixtures. The buttons were tested in the as-cast and annealed conditions. A large matrix of compositions was tested within the following ranges: 0-45% copper, 0-3% palladium, 0-5% molybdenum and 0-67% dilution by 304L. Cyclic potentiodynamic polarization measurements and long term exposure tests were performed in 0.1M NaCl and artificial seawater. The present inventors found that compositions with between five and ten percent copper imparted desirable corrosion resistance properties, even for aggressive environments.

Figure 3:
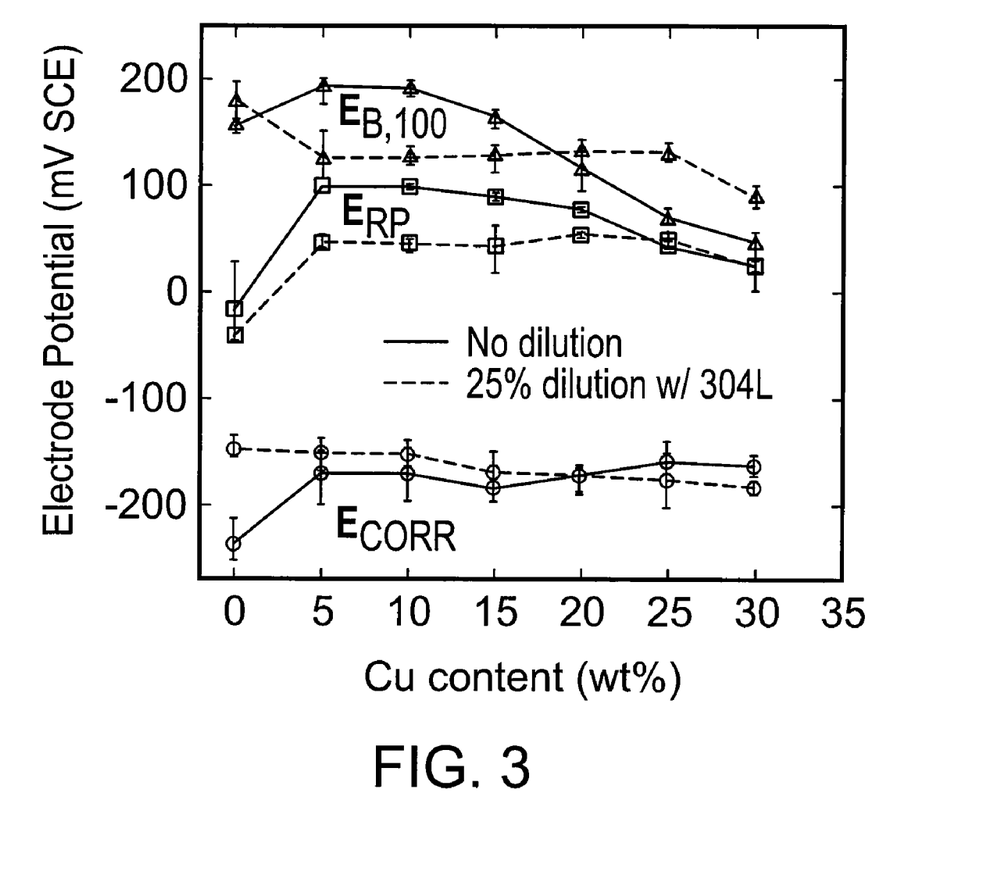
FIG. 3 graphically shows the effect of copper content and 25% dilution with 304L on corrosion potential, breakdown potential and repassivation potential of as-cast Ni—Cu-304L buttons in aerated 0.1M NaCl according to the present invention.
Figure 4:
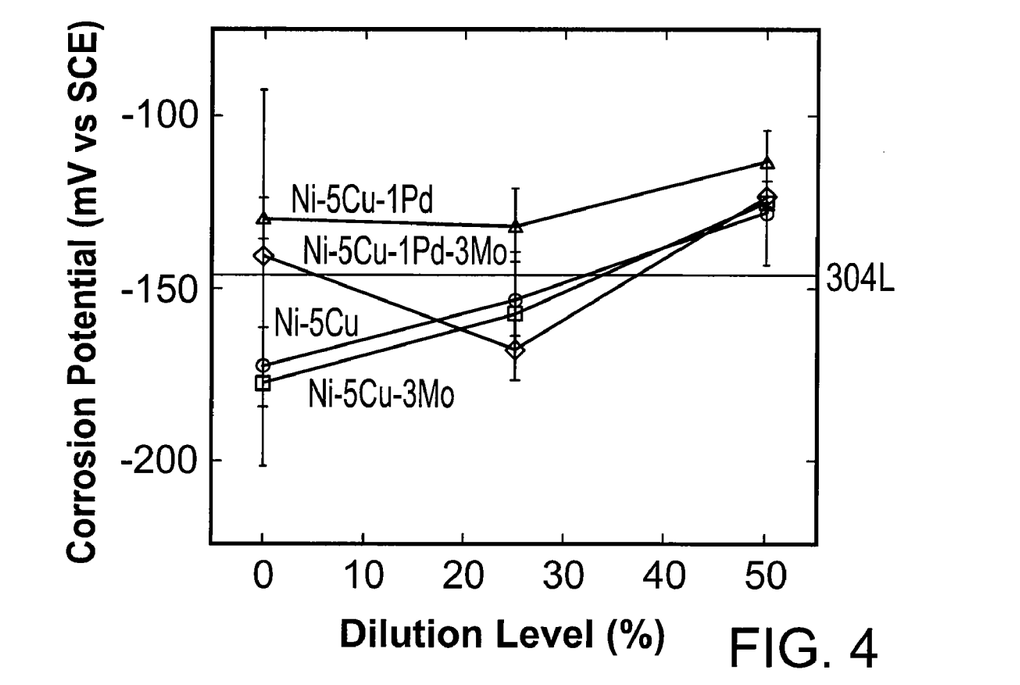
FIG. 4 graphically shows the corrosion potential of Ni-5Cu—X alloys as a function of dilution in aerated 0.1M NaCl according to the present invention.

Referring next to FIG. 3, the effects of copper content and 25% dilution are shown for as-cast nickel-copper alloys tested in 0.1M NaCl. Three characteristic potentials are provided for each condition: $E_{CORR}$, which is the corrosion or open circuit potential, $E_{B,100}$, which is the breakdown potential as indicated by the potential at which the current density is 100 µA/cm², and $E_{RP}$, which is the repassivation potential. For samples with no dilution, all three characteristic potentials increase as the copper content goes from 0 to 5%, which represents an improvement in performance. There is little difference in $E_{CORR}$ at higher copper contents, but the breakdown and repassivation potentials decrease when the copper content is above 10%. Both the breakdown and repassivation potentials are lower in this range of 5-10% copper when the alloy is diluted with 25% 304L. It should be noted that the values for 304L in this solution are: $E_{CORR}$=−144 mV SCE (shown, for example, in FIG. 4), $E_{B,100}$=291 mV SCE, $E_{RP}$=−94 mV SCE. The breakdown potential is higher than for these nickel-copper alloys, which reflects a greater intrinsic localized corrosion resistance. However, the $E_{RP}$ values of the alloys are higher than for 304L and the $E_{CORR}$ of both the stainless steel and the nickel-copper alloys are far below the alloy repassivation potentials. This is a good indication that the alloys will not suffer localized corrosion in this environment. This is in line with the good performance of Monel®/ 304L welds in long term exposure tests in 0.1M NaCl, and appears to be capable of even better performance than Monel®/304L welds in long term exposure to more severe environments.

Figure 5:
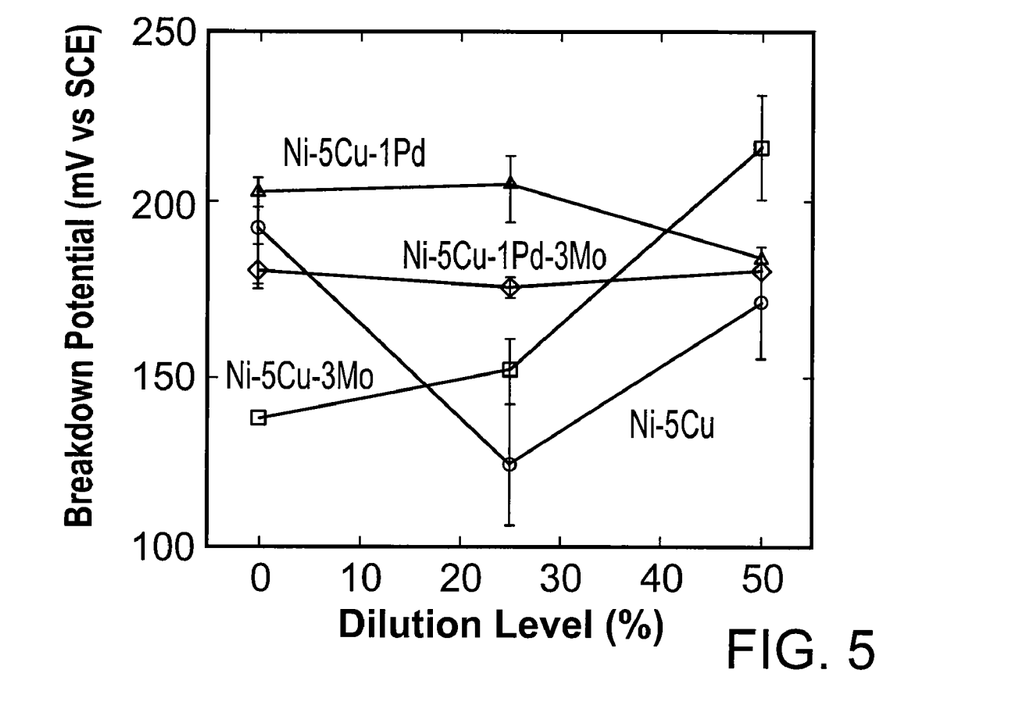
FIG. 5 graphically shows the breakdown potential of Ni-5Cu—X alloys as a function of dilution in aerated 0.1M NaCl according to the present invention.
Figure 6:
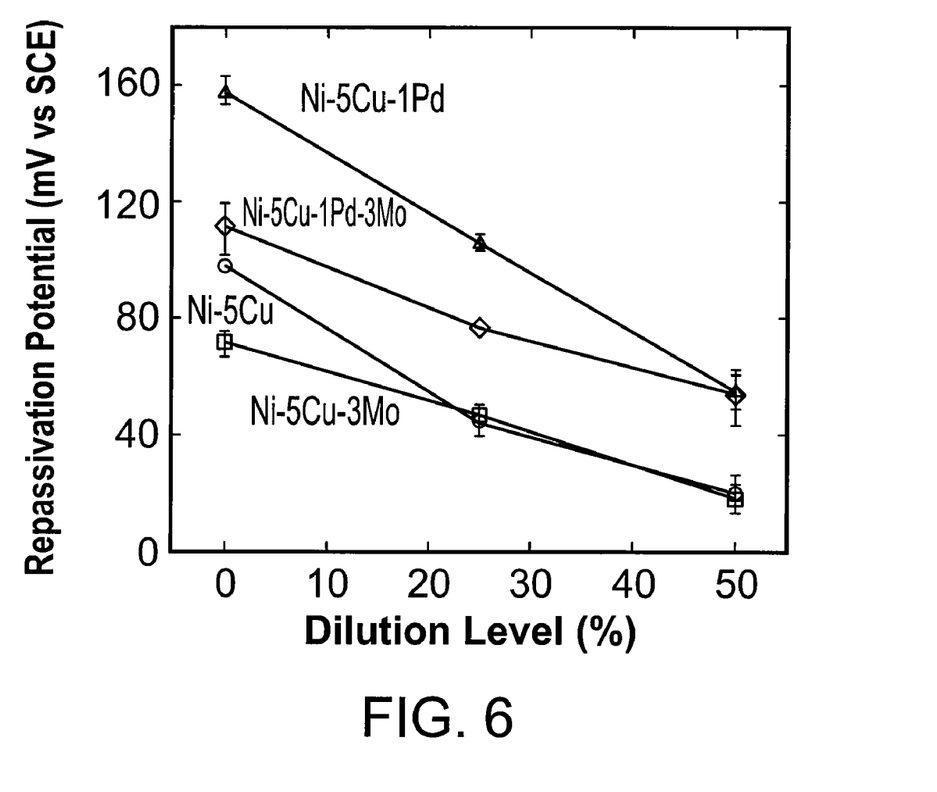
FIG. 6 graphically shows the repassivation potential of Ni-5Cu—X alloys as a function of dilution in aerated 0.1M NaCl according to the present invention.

As mentioned above, the best corrosion performance is found with a low copper content. The effects of alloying with small amounts of palladium and molybdenum were also studied. Palladium is of interest because it increases the resistance to localized corrosion and can ennoble alloys, which is beneficial because of the desire to slightly increasing the corrosion potential of the weld above that of the base metal. Molybdenum is often added to corrosion-resistant alloys to improve localized corrosion behavior. The behavior of Ni-5Cu is compared to that of Ni-5Cu-1Pd, Ni-5Cu-3Mo, and Ni-5Cu-1Pd-3Mo in FIGS. 4 through 6, which present the values of $E_{CORR}$, $E_{B,100}$, and $E_{RP}$ as a function of weld dilution. Of these, the Ni-5Cu-1Pd alloy exhibited the highest values of all three critical potentials, except for the extreme case of 50% dilution. In that instance, another of the alloys of the present invention, Ni-5Cu-3Mo, exhibited the highest breakdown potential. While the general trend appears to favor low (i.e., approximately five to ten percent copper concentrations), and one particular composition (Ni-5Cu-1Pd) appeared to demonstrate desirable values for all three characteristic potentials, it will be appreciated by those skilled in the art that the specific composition depends on numerous factors, including intended use, cost, corrosion and embrittlement resistance.

While certain representative embodiments and details have been shown for purposes of illustrating the invention, it will be apparent to those persons skilled in the art that various changes in the methods and apparatus disclosed herein may be made without departing from the scope of the invention.

What is claimed is:

1. A method of welding a stainless steel base material, said method comprising:
    providing a substantially chromium-free welding consumable that comprises up to approximately five percent by weight of palladium, up to approximately ten percent by weight of molybdenum, between approximately five percent and approximately twenty five percent by weight copper and a balance of nickel and other non-copper alloying ingredients, wherein said other non-copper alloying ingredients comprise up to five percent by weight of said consumable; and
    welding said base material with said consumable to produce a welded composition such that fumes from at least one of said consumable used in or a weld pool produced by said welding contain substantially no hexavalent chromium.

2. The method of claim 1, wherein said method produces less than a forty percent dilution by said base material.

3. The method of claim 1, wherein said base material comprises an austenitic stainless steel.

4. The method of claim 3, wherein said austenitic stainless steel comprises type 304 stainless steel.

5. The method of claim 1, wherein said welding consumable comprises approximately five weight percent copper and approximately one weight percent palladium.

6. The method of claim 1, wherein said welding is selected from the group consisting of comprises shielded metal arc welding and gas tungsten arc welding.

7. A method of reducing the generation of hexavalent chromium during stainless steel base material welding, said method comprising:
providing a substantially chromium-free welding consumable comprising up to approximately ten percent by weight of at least one element selected from the group consisting of molybdenum, tungsten and palladium, copper and a balance of nickel and up to five percent other alloying elements; and
welding said base material with said consumable to produce a welded composition such that fumes arising from at least one of said consumable used in or a weld pool produced by said welding are substantially free of hexavalent chromium.

8. The method of claim 7, wherein said consumable comprises copper in an amount between approximately five and approximately twenty five percent by weight.

9. The method of claim 7, wherein said consumable comprises palladium in an amount up to approximately one percent by weight.

10. The method of claim 7, wherein said consumable further comprises a deoxidizing agent selected from the group consisting of aluminum and titanium.

11. The method of claim 7, wherein at least one of a breakdown potential and a repassivation potential of said consumable is higher than a corrosion potential of said base material.

12. The method of claim 11, wherein a corrosion potential of said consumable is at least as great as that of said base material.

13. The method of claim 7, wherein said welding is selected from the group consisting of comprises shielded metal arc welding and gas tungsten arc welding.

14. The method of claim 7, wherein said consumable comprises approximately five weight percent copper and approximately one weight percent palladium.

15. The method of claim 7, wherein said consumable comprises approximately five weight percent copper and approximately three weight percent molybdenum.

16. A method of welding stainless steel with a substantially chromium-free nickel alloy welding electrode, said method comprising:
providing a substantially chromium-free welding consumable comprising up to approximately twenty five percent by weight copper; up to approximately ten percent by weight of at least one element selected from the group consisting of molybdenum and palladium, and a balance of nickel and up to five percent other alloying elements; and
welding said base material with said consumable to produce a welded composition such that fumes arising from at least one of said consumable used in or a weld pool produced by said welding are substantially free of hexavalent chromium.

17. The method of claim 16, wherein said consumable comprises approximately five weight percent copper and approximately one weight percent palladium.

18. The method of claim 16, wherein said consumable comprises approximately five weight percent copper and approximately three weight percent molybdenum.

19. The method of claim 16, wherein said consumable further comprises at least one element selected from the group consisting of silicon and manganese, either in an amount up to approximately three percent by weight.

* * * * *

UNITED STATES PATENT AND TRADEMARK OFFICE
Certificate

Patent No. 7,743,967 B2　　　　　　　　　　　　　　　　　　　　　Patented: June 29, 2010

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Gerald S. Frankel, Columbus, OH (US); John C. Lippold, Hillard, OH (US); and Yeong Ho Kim, Incheon (KR).

Signed and Sealed this Twelfth Day of February 2013.

ROY KING
*Supervisory Patent Examiner*
Art Unit 1733
Technology Center 1700